(12) United States Patent
Fujimoto et al.

(10) Patent No.: US 9,417,622 B2
(45) Date of Patent: Aug. 16, 2016

(54) CONTROLLER AND CONTROL METHOD

(71) Applicants: The University of Tokyo, Tokyo (JP); DMG MORI SEIKI CO., LTD., Nara (JP)

(72) Inventors: Hiroshi Fujimoto, Tokyo (JP); Hongzhong Zhu, Tokyo (JP); Koji Yamamoto, Nara (JP); Shinji Ishii, Nara (JP)

(73) Assignees: DMG MORI SEIKI CO., LTD., Nara (JP); THE UNIVERSITY OF TOKYO, Tokyo (JP)

( * ) Notice: Subject to any disclaimer, the term of this patent is extended or adjusted under 35 U.S.C. 154(b) by 99 days.

(21) Appl. No.: 14/474,823

(22) Filed: Sep. 2, 2014

(65) Prior Publication Data
US 2015/0145464 A1    May 28, 2015

(30) Foreign Application Priority Data

Nov. 22, 2013    (JP) .................................. 2013-242114

(51) Int. Cl.
*G05B 19/18*    (2006.01)
*G05B 19/404*    (2006.01)

(52) U.S. Cl.
CPC .... *G05B 19/404* (2013.01); *G05B 2219/41154* (2013.01); *G05B 2219/41155* (2013.01)

(58) Field of Classification Search
CPC .... G05B 19/404; G05B 13/042; G05B 19/19; G05B 2219/41154; G05B 11/42; G05B 11/28; G05B 13/021; G05B 13/041; G05B 19/41; G05B 19/4103; G05B 19/416; G05B 19/4163; G05B 2219/34027; G05B 2219/341

USPC .......................................... 318/568, 619, 620
See application file for complete search history.

(56) References Cited

U.S. PATENT DOCUMENTS 6,060,854 A * 5/2000 Yutkowitz ............ G05B 19/404
                                                    318/574
6,252,368 B1 * 6/2001 Sugie ................... G05B 19/404
                                                    318/568.22

(Continued)

OTHER PUBLICATIONS

Hongzhong Zhu, Hiroshi Fujimoto (The University of Tokyo); "Sine-Function-Based Friction Compensation for Ball-Screw-Driven Stage in Zero-Velocity Region including Non-Velocity-Reversal Motion"; The proceedings of Joint Technical Meeting on Industrial Instrument and Control/Mechatronics Control; The Institute of Electrical Engineers of Japan; Mar. 7, 2013; Lecture No. IIC-13-026,MEC-13-026.

(Continued)

*Primary Examiner* — Paul Ip
(74) *Attorney, Agent, or Firm* — Miller, Matthias & Hull LLP

(57) ABSTRACT

A controller has a control unit generating a control signal to control a drive motor and a friction compensation unit adding a friction compensation signal to the control signal for compensating for a positioning error caused by friction in a guide unit. When reversing the direction of movement of the movable body, the friction compensation unit generates a friction compensation signal in accordance with a function f(α) representing a friction compensation value uf by a relationship with a variable α and asymptotically approaching the maximum value and the minimum value of the friction compensation value uf and having an inflection point therebetween, and adds the generated friction compensation signal to the control signal generated by the control unit during movement of the movable body a predetermined movement distance from before to after the reversing.

5 Claims, 7 Drawing Sheets

(56) References Cited

U.S. PATENT DOCUMENTS

| | | | | |
|---|---|---|---|---|
| 6,285,913 B1* | 9/2001 | Hagglund | ............... | G05D 16/02 700/44 |
| 2003/0201746 A1* | 10/2003 | Eguchi | ................. | G05B 19/404 318/567 |
| 2011/0251722 A1* | 10/2011 | Okitsu | ................. | G05B 13/042 700/275 |
| 2012/0046793 A1* | 2/2012 | Song | ................. | G05B 19/4142 700/282 |

OTHER PUBLICATIONS

Hongzhong Zhu, Hiroshi Fujimoto (The University of Tokyo); "High-Precision Control for Ball-Screw-Driven Stage in Zero-Speed Region by Explicitly Considering Elastic Deformation"; The Papers of Technical Meeting on "Mechatronics Control", The Institute of Electrical Engineers of Japan; Sep. 3, 2013; Lecture No. MEC-13-162.

* cited by examiner

PRIOR ART

CONTROLLER AND CONTROL METHOD

BACKGROUND

1. Field of the Disclosure

The present disclosure relates to a controller and a control method for controlling a feed apparatus for moving a movable body.

2. Background of the Disclosure

The feed apparatus generally has a guide unit for guiding movement of the movable body and a drive unit for moving the movable body, and, for example, the guide unit comprises a rolling guide mechanism or a sliding guide mechanism, while the drive unit comprises a ball screw, a nut fixed to the movable body and screwed to the ball screw, and a drive motor for rotating the ball screw about its axis to move the nut and the movable body coupled to the nut.

The controller controlling the feed apparatus is configured to generate a control signal based on a target movement position of the movable body and drive the drive motor under the control signal to cause the drive motor to rotate the ball screw about its axis so as to move the movable body to the target movement position.

Incidentally, as a representative example of a field to which the above-described feed apparatus is applied, the field of machine tools can be given. However, beside this field, the feed apparatus is applied to various fields, and, in recent years, highly accurate positioning control is more and more required. In particular, there is a problem that, if tracking delay occurs when reversing the feeding direction, a so-called "quadrant glitch" occurs in a case where the feed apparatus has two or more feed axes and the feed axes are controlled simultaneously.

In view of such background, conventionally, attention has been given to friction inherent in the feed apparatus as one of the factors causing a tracking error of the movable body and various researches have been made for compensating for a tracking error caused by the friction. According to such conventional researches, it is considered that, in the feed apparatus, a uniform (constant) Coulomb friction occurs before reversing the movable body, while non-linear friction variation occurs in a certain section as a transition period after reversing the movable body and then a uniform Coulomb friction occurs.

The inventors of this application have already suggested a controller disclosed in Proceedings of Joint Technical Meeting on Industrial Instrumentation and Control/Mechatronics Control, IIC-13-026/MEC-13-026 as a controller which effectively corrects a tracking error due to such friction. This controller has a friction compensation unit for compensating for a tracking error due to friction, and the friction compensation unit is configured to calculate a compensation value in accordance with the following Equation 3 (Sinc-Function-Based Friction Compensation Model) and apply a current which has been corrected in accordance with the calculated compensation value to a drive motor, thereby compensating for the tracking error of the movable body.

$$f(x) = \begin{cases} -F_0, & x < 0 \\ 2F_0 \dfrac{\sin\left(\pi\sqrt{x/x_s} - \pi\right)}{\pi\sqrt{x/x_s} - \pi} - F_0, & 0 \leq x < x_s \\ F_0, & x \geq x_s \end{cases}$$ [Equation 3]

It is noted that, in Equation 3, a position of x=0 is a reversing position and x represents a distance to the movable body from the reversing position, where x is negative (x<0) before reversing and is positive (x>0) after reversing.

In the friction compensation unit, as represented by the above Equation 3, a friction value before the movable body is reversed is estimated to be a constant value ($-F_0$), a friction value in a subsequent certain section including the time of reversing the movable body ($0 \leq x < x_s$) is estimated by a non-linear sinc function, and a friction value after the certain section ($x_s \leq x$) is estimated to be a constant value ($F_0$), and, as described above, the friction compensation unit compensates for the tracking error of the movable body by calculating a friction compensation value in accordance with the friction value estimated by Equation 3 and applying a current which has been corrected in accordance with the calculated friction compensation value to the drive motor.

Thus, according to the controller suggested by the inventors, the accuracy of positioning the movable body can be improved as compared with other conventional controllers.

SUMMARY OF THE DISCLOSURE

As described above, according to the controller suggested by the inventors, which is disclosed in the above, the accuracy of positioning the movable body can be improved as compared with other conventional controllers. However, as a result of further research, the present inventors have found that a non-linear variation occurs in the friction in the feed apparatus in a certain section before reversing the movable body and in a certain section after revering the movable body. This will be described in detail using the drawings.

FIG. 7 is a structure model schematically representing a structure of a feed apparatus 70, wherein the reference numeral 76 denotes a rotary shaft of a drive motor, 77 denotes a coupling, 71 denotes a screw shaft of a ball screw, 78 denotes a ball of the ball screw, 74 denotes a nut, 79 denotes a guide, 80 denotes a table, and 81, 82 each denote a bearing.

In the feed apparatus 70, a rotational force of the rotary shaft 76 of the drive motor is transmitted to the screw shaft 71 of the ball screw by the coupling 77, and a driving force in the direction of the arrow X acts on the nut 74 via the ball 78 of the ball screw due to rotation of the screw shaft 71, and thereby the table 80 fixed to the nut 74 is guided by the guide 79 and is moved in the direction of the arrow X together with the nut 74.

FIG. 8 is a physical model of the above structure model, wherein elastic body portions are schematically represented by springs. In the drawing, each of $J_m$, $J_{ls}$, $J_{ms}$, $J_{rs}$ is an inertia of each portion, each of $M_{ls}$, $M_{ms}$, $M_{rs}$, $M_t$ is a mass of each portion, each of $K_{ls}$, $K_{rs}$ is a rigidity of the screw shaft 71 in an axial direction thereof, $K_o$ is a torsional rigidity of the screw shaft 71 from the motor to the nut, $k_n$ is a rigidity of the ball of the ball screw, $K_b$ is a rigidity of a ball of the bearing, and $f_n$ is a frictional force between the ball of the ball screw and the nut. Further, the subscripts l, m and r mean "left", "middle", and "right", respectively.

Further, FIGS. 9 and 10 show mechanical states before the table 80 is reversed in the physical model. FIG. 9 shows a mechanical state before reversing the table 80 in a case where the table 80 which is moving at a relatively low velocity is decelerated at a small deceleration and reversed, while FIG. 10 shows a mechanical state before reversing the table 80 in a case where the table 80 which is moving at a relatively high velocity is decelerated at a high deceleration and reversed.

As shown in FIG. 9, when the table 80 is decelerated at a small deceleration and reversed, since an inertial force of the table 80 is small and a thrust force by the drive motor is larger than the inertial force, it is conceivable that a compression force acts on, of the balls 78 between the screw shaft 71 and the nut 74, a ball 78 positioned on the moving direction side (which is the side of the arrow X direction and the right side of the drawing sheet) and the ball 78 positioned on the moving direction side is elastically deformed in the compression direction. Further, a reaction force compressing the ball 78 acts on the screw shaft 71 and a ball of the bearing 81, which is positioned on the side opposite to the moving direction (the left side of the drawing sheet), are compressed by the reaction force, and thereby the screw shaft 71 between the ball 78 positioned on the moving direction side and the bearing 81 and the ball of the bearing 81 are elastically deformed in the compression direction.

On the other hand, when the table 80 is decelerated at a high deceleration and reversed, as shown in FIG. 10, since the inertial force of the table 80 is large and the thrust force by the drive motor hardly acts, it is conceivable that a compression force acts on, of the balls 78 between the screw shaft 71 and the nut 74, a ball 78 positioned on the side opposite to the moving direction (the left side of the drawing sheet) and the ball 78 positioned on the opposite side is elastically deformed in the compression direction. Further, a reaction force compressing the ball 78 acts on the screw shaft 71 and a ball of the bearing 82, which is positioned on the moving direction side, are compressed by the reaction force, and thereby the ball shaft 71 between the ball 78 positioned on the opposite side and the bearing 82 and the balls of the bearing 82 are elastically deformed in the compression direction.

Thus, it is conceivable that, when the table 80 is reversed, elastic deformation occurs on the screw shaft 71, the balls 78 of the ball screw, the balls of the bearing 81, 82 etc. also before the reversing regardless of the moving velocity of the table 80, and thereby a tracking error occurs on the table 80. Accordingly, for achieving a more highly accurate positioning, it is necessary to compensate for such a tracking error before reversing.

The present disclosure has been achieved in view of the above-described circumstances, and an object thereof is to provide a controller and a control method which can control positioning of a movable body with a high accuracy when a feeding direction of the movable body is reversed.

The present disclosure, for achieving the above-described object, relates to a control method of, in a feed apparatus having a guide unit which guides movement of a movable body in a predetermined movement-axis direction, and a drive unit which has a ball screw, a ball nut, and a drive motor for rotating the ball screw and moves the movable body in the movement-axis direction, controlling operation of the drive motor, the control method comprising:

generating, based on given target movement position and moving velocity, a command movement position at time intervals corresponding to the moving velocity;

generating a control signal in accordance with the generated command movement position to control the drive motor; and adding a friction compensation signal to the control signal in order to compensate for at least a positioning error caused by friction in the guide unit, wherein when reversing rotation of the drive motor to reverse the direction of movement of the movable body, during movement of the movable body a predetermined movement distance from before to after the reversing of the direction of movement of the movable body, a friction compensation signal generated in accordance with a function f($\alpha$) which represents a friction compensation value uf by a relationship with a variable $\alpha$ and which asymptotically approaches the maximum value and the minimum value of the friction compensation value uf and has an inflection point therebetween is added to the control signal.

Further, the above control method is preferably implemented by a controller which, in a feed apparatus having a guide unit which guides movement of a movable body in a predetermined movement-axis direction and a drive unit which has a ball screw, a ball nut and a drive motor for rotating the ball screw and moves the movable body in the movement-axis direction, controls operation of the drive motor, the controller including:

a control unit generating, based on given target movement position and moving velocity, a command movement position at time intervals corresponding to the moving velocity and generating a control signal in accordance with the generated command movement position to control the drive motor; and a friction compensation unit adding a friction compensation signal to the control signal in order to compensate for at least a positioning error caused by friction in the guide unit, wherein when rotation of the drive motor is reversed by the control unit to reverse the direction of movement of the movable body, during movement of the movable body a predetermined movement distance from before to after the reversing of the direction of movement of the movable body, the friction compensation unit adds, to the control signal, a friction compensation signal generated in accordance with a function ($\alpha$) which represents a friction compensation value uf by a relationship with a variable $\alpha$ and which asymptotically approaches the maximum value and the minimum value of the friction compensation value uf and has an inflection point therebetween.

According to the controller of the present disclosure, based on given target movement position and moving velocity, the control unit generates a command movement position at time intervals corresponding to the moving velocity and further generates a control signal in accordance with the generated command movement position. The drive motor is controlled based on the control signal, and thereby the movable body is moved to the target movement position at a predetermined velocity.

By the way, as described above, in a feed apparatus including a rolling body, such as a ball screw, as a component, when the direction of movement of the movable body moved by the ball screw is reversed, elastic deformation occurs on a rolling body, a screw shaft and the like of the ball screw before and after the reversing, which results in the occurrence of a movement error (tracking error) between the target movement position and the actual movement position.

Therefore, when rotation of the drive motor is reversed and thereby the direction of movement of the movable body is reversed, during movement of the movable body a predetermined movement distance from before to after the reversing, a friction compensation signal for compensating for such a tracking error is added to the control signal by the friction compensation unit in a feed-forward manner.

It is noted that the friction compensation signal generated in the friction compensation unit is generated in accordance with a function f($\alpha$) representing a friction compensation value uf by a relationship with a variable $\alpha$, and asymptotically approaching the maximum value and the minimum value of the friction compensation value uf and having an inflection point therebetween. That is, the friction compensation signal is generated based on the friction compensation value uf calculated in accordance with the function f($\alpha$).

Thus, according to the present disclosure, before and after the direction of movement of the movable body is reversed, the control signal generated in the control unit is corrected by the friction compensation signal generated in the friction compensation unit and the drive motor is controlled in accordance with the corrected control signal. Therefore, when the direction of movement of the movable body is reversed, a tracking error occurring before and after the reversing can be compensated for, and therefore the movable body can be positioned with a high accuracy. Further, since the friction compensation signal is calculated in accordance with the function f(α) asymptotically approaching the maximum value and the minimum value of the friction compensation value uf and having an inflection point therebetween, a friction compensation signal which does not accompany a sudden change, that is, which changes smoothly, can be generated, and thereby a smooth tracking performance of the movable body can be achieved.

It is noted that it is conceivable that the above-described elastic deformation of the rolling body, the screw shaft and the like of the ball screw eventually affects a frictional force inherent in the feed apparatus and the tracking error occurring due to the elastic deformation occurs due to change in the frictional force caused by the elastic deformation. Therefore, in the present disclosure, compensation of a tracking error caused by the elastic deformation is considered to be friction compensation.

Further, in the present disclosure, the friction compensation signal generated in the friction compensation unit may be generated in accordance with a function (α) which is a sigmoid function, and the sigmoid function f(α) may be a function f(x) represented by the following Equation 1. In this function f(x), using the reversing position of the movable body as a reference, the variable α is a distance x from the reversing position to the movable body.

$$f(x) = F_0 \frac{x/\sigma}{\sqrt{1+(x/\sigma)^2}} \quad \text{[Equation 1]}$$

Where $F_0$ is the maximum friction compensation value and σ is a constant determined empirically.

Alternately, the sigmoid function f(α) may be a function f($I_d$) represented by the following Equation 2. This function f($I_d$) is a function using $I_d$ which is a ratio of a relative displacement amount $dx_t$ between the ball nut and the ball screw to an amount of rotation dθ of the ball screw as the variable α.

$$f(I_d) = F_0 \frac{1/(\delta(I_d - R))}{\sqrt{1+(1/(\delta(I_d - R))^2)}} \quad \text{[Equation 2]}$$

Where $I_d = dx_t/dθ$, $F_0$ is the maximum friction compensation value, $dx_t$ and dθ are each an actual measured value, R is a theoretical relative displacement amount between the ball nut and the ball screw per rotation of the ball screw, and δ is a constant determined theoretically or empirically.

A friction compensation signal changing smoothly can be generated also by the function f(x) or the function f($I_d$), and thereby a smooth tracking performance of the movable body can be achieved.

According to the controller and the control method of the present disclosure, since the control signal generated in the control unit is corrected by the friction compensation signal generated in the friction compensation unit before and after reversing the direction of movement of the movable body, a tracking error occurring before and after the reversing of the movable body can be compensated for, and thereby the movable body can be positioned with a high accuracy.

Further, since the friction compensation signal is calculated in accordance with any one of the function f(α), the function f(x) and the function f($I_d$), which each asymptotically approach the maximum value and the minimum value of the friction compensation value of and have an inflection point therebetween, a friction compensation signal which does not accompany a sudden change and changes smoothly can be obtained, and thereby a smooth tracking performance of the movable body can be achieved.

BRIEF DESCRIPTION OF THE DRAWINGS

For a more complete understanding of the disclosed methods and apparatus, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

A specific embodiment of the present disclosure will be described below with reference to the drawings.

1. Configuration of Device

Figure 1:
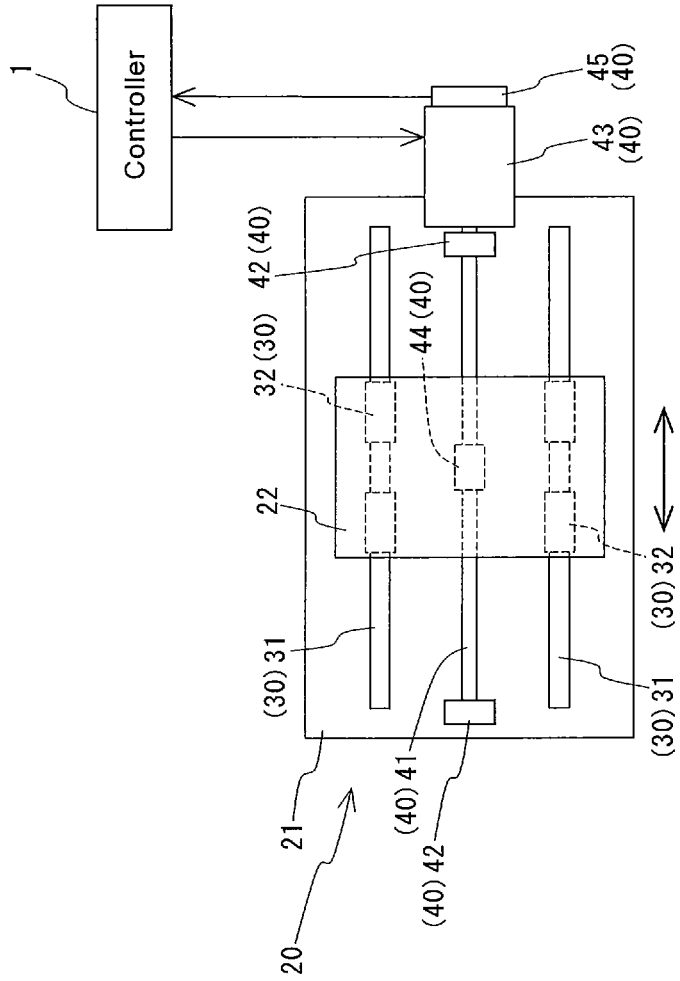
FIG. 1 is an explanatory diagram showing a schematic configuration of a controller etc. according to one embodiment of the present disclosure.

First, configurations of a feed apparatus and a controller of this embodiment will be described. FIG. 1 is a schematic plan view showing the feed apparatus and the controller of this embodiment, and FIG. 2 is a block diagram showing a schematic configuration of the controller.

A feed apparatus 20 is provided in a machine tool, for example, and, as shown in FIG. 1, it has a guide unit 30 and a drive unit 40, which are disposed on a base 21. The guide unit 30 comprises a pair of guide rails 31 disposed on the base 21 to be parallel with each other along the arrow direction with an appropriate interval therebetween, and four sliders 32 fixed to a lower surface of a movable body 22 and engaged with the guide rails 31 to be movable along the guide rails 31, and the movable body 22 is movable in the arrow direction by the guide unit 30.

Further, the drive unit 40 comprises a ball screw 41 disposed along the arrow direction between the pair of guide rails 31, a nut 44 fixed to the lower surface of the movable body 22 and screwed to a screw shaft of the ball screw 41 via a ball, a pair of bearings 42 disposed on the base 21 and supporting both end portions of the ball screw 41 so that the end portions are rotatable, a drive motor 43 disposed on the base 21 and rotating the screw shaft of the ball screw 41 about its axis, and a detector 45 detecting a rotational angular position of the drive motor 43.

Figure 2:
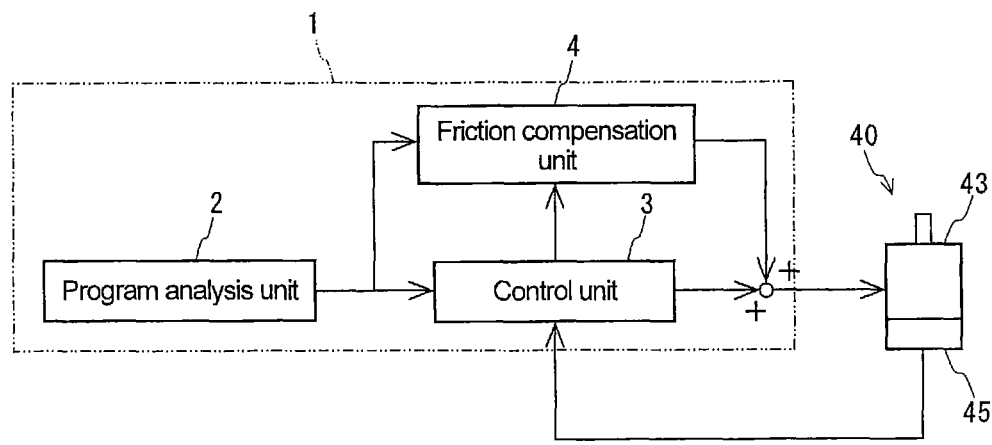
FIG. 2 is a block diagram showing a schematic configuration of the controller according to the embodiment.

A controller 1 controls operation of the drive motor 43, and, as shown in FIG. 2, has a program analysis unit 2, a control unit 3, a friction compensation unit 4, and other components.

The program analysis unit 2 analyzes an NC program stored in an appropriate storage unit (not shown) or an NC program input as appropriate to extract commands relating to a target movement position and a moving velocity of the movable body 22 contained in the NC program, and transmits the extracted commands relating to the target movement position and the moving velocity to the control unit 3.

The control unit 3 receives the commands relating to the target movement position and the moving velocity transmitted from the program analysis unit 2, generates a command movement position at time intervals corresponding to the moving velocity based on the received commands, generates a control signal (current control signal) in accordance with the generated command movement position, and controls operation of the drive motor 43 in accordance with the control signal (current control signal). At this time, based on a signal relating to the present angular position of the drive motor 43 (namely, the present position of the movable body 22) transmitted from the detector 45, the control unit 3 performs feedback control on the drive motor 43 in order to correct deviation between the command movement position and the present position.

The friction compensation unit 4 receives the commands relating to the target movement position output from the program analysis unit 2 and a signal relating to the command movement position output from the control unit 3, recognizes, based on the received commands relating to the target movement position and the received signal relating to the command movement position, a reversing position at which a direction of movement of the movable body 22 is reversed, calculates a friction compensation value corresponding to the position of the movable body 22, namely, generates a friction compensation signal, and adds the generated friction compensation signal to the current control signal output from the control unit 3.

Specifically, the friction compensation unit 4 sets the friction compensation value to a maximum friction compensation value $F_0$ or a minimum friction compensation value $-F_0$ for a section where the movable body 22 moves at a constant velocity, and the friction compensation value is calculated in accordance with the following Equation 1 for a section where the movable body 22 is accelerated or decelerated.

$$f(x) = F_0 \frac{x/\sigma}{\sqrt{1+(x/\sigma)^2}} \quad \text{[Equation 1]}$$

Figure 3:
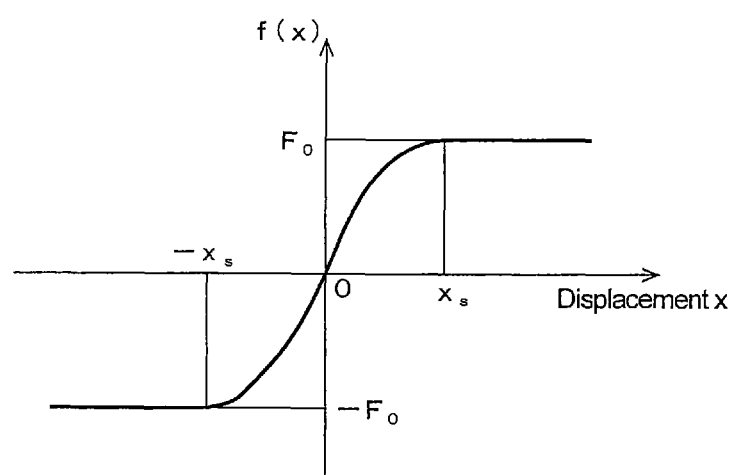
FIG. 3 is a diagrammatic drawing showing a function used in a friction compensation unit of the embodiment.

The function f(x) is a so-called sigmoid function and is represented as a diagrammatic drawing asymptotically approaching the maximum friction compensation value $F_0$ and the minimum friction compensation value $-F_0$ and having an inflection point between the maximum friction compensation value $F_0$ and the minimum friction compensation value $-F_0$, as shown in FIG. 3. It is noted that x represents a distance from a reference position to the movable body 22, where a stop position of the movable body 22 (a movement start position or a movement end position, or, when the direction of movement of the movable body 22 is reversed, the reversing position) is defined as the reference position. Further, $\sigma$ is a constant determined empirically (experimentally) so that the friction compensation value to be calculated becomes an appropriate value.

For example, in a case where the movable body 22 being in a stopped state is driven and moved, according to FIG. 3, when the movable body 22 is in an acceleration state, the friction compensation value is calculated in accordance with a non-linear curve of the above function f(x), namely, an upward convex curve, for example, until the position x of the movable body 22 reaches $x_s$ from 0 in the acceleration state. Thereafter, the friction compensation value is set to the maximum friction compensation value $F_0$ when the position x of the movable body 22 exceeds $x_s$.

Further, when the movable body 22 being in a moving state is stopped, according to FIG. 3, the friction compensation value is set to the minimum friction compensation value $-F_0$ until the movable body 22 shifts from a constant-velocity state to a deceleration state and the position x of the movable body 22 reaches $-x_s$. Thereafter, until the position x of the movable body 22 reaches 0 from $-x_s$ and the movable body 22 is stopped, the friction compensation value is calculated in accordance with a non-linear curve of the function f(x), namely a downward convex curve.

Further, when the direction of movement of the movable body 22 is reversed while the movable body 22 is moved, according to FIG. 3, the friction compensation value is set to the minimum friction compensation value $-F_0$ until the movable body 22 shifts from a constant-velocity state to a deceleration state and the position x of the movable body 22 reaches $-x_s$. Thereafter, the friction compensation value is calculated in accordance with the non-linear S-shaped curve of the above function f(x) while the movable body 22 is further decelerated and stopped and then is accelerated in the opposite direction, namely, until the position x of the movable body 22 reaches $x_s$ from $-x_s$ via 0, and the friction compensation value is set to the maximum friction compensation value $F_0$ when the position x of the movable body 22 has exceeded $x_s$.

It is noted that, although, in FIG. 3, the distance x of the movable body 22 and the frication compensation value in the feeding direction approaching the reference position are negative and the distance x of the movable body 22 and the frication compensation value in the feeding direction going away from the reference position are, on the other hand, positive, these settings are just for the sake of convenience, and, as a matter of course, the present disclosure is not limited thereto and the settings are made as appropriate in conformity with the actual control condition.

Further, the position $x_s$ defining the section for which the friction compensation value is calculated by the sigmoid function f(x) is set as appropriate by an empirical approach such as an experiment so that the tracking error of the movable body 22 is within an allowable range, and the position $x_s$ may be set to a position at which the movable body 22 is in an acceleration or deceleration state and may be set to a position at which the movable body 22 is in a constant-velocity state.

2. Operation of Device

Next, operations of the feed apparatus 20 and the controller 1 of the embodiment, which have the above-described configurations, will be described.

First, the program analysis unit 2 extracts commands relating to the target movement position and the moving velocity of the movable body 22 contained in the NC program, and transmits the extracted commands relating to the target movement position and the moving velocity to the control unit 3.

Then, the control unit 3 generates a command movement position at time intervals corresponding to the moving velocity based on the commands relating to the target movement position and the moving velocity transmitted from the program analysis unit 2, and further generates a control signal (current control signal) in accordance with the generated command movement position, and operation of the drive motor 43 is controlled in accordance with the control signal (current control signal). That is, the drive motor 43 is supplied with a current corresponding to the control signal and the drive motor 43 is driven by the current.

Thus, once the drive motor 43 is driven, a rotational force thereof is transmitted to the screw shaft of the ball screw 41 and the screw shaft is rotated about its axis, and the rotation of the screw shaft causes a thrust force to act on the nut 44 via the ball of the ball screw 41 and the movable body 22 coupled to the nut 44 is guided by the guide unit 30 and moved in the direction of the thrust force (the arrow direction in FIG. 1).

At this time, a signal relating to the present angular position of the drive motor 43 (namely, the present position of the movable body 22) is fed back to the control unit 3 from the detector 45, and deviation between the command movement position and the present position is corrected.

On the other hand, in the friction compensation unit 4, a friction compensation value corresponding to the position of the movable body 22 is calculated based on the commands relating to the target movement position input from the program analysis unit 2 and a signal relating to the command movement position input form the control unit 3. That is, according to FIG. 3, when the position x of the movable body 22 satisfies $x \leq -x_s$, the minimum friction compensation value $-F_0$ is set as the friction compensation value; when the position x of the movable body 22 satisfies $x \geq x_s$, the maximum friction compensation value $F_0$ is set as the friction compensation value; and when the position x of the movable body 22 satisfies $-x_s \geq x \geq x_s$, the friction compensation value is calculated in accordance with the above Equation 1. Then, a friction compensation signal corresponding to the calculated friction compensation value is generated. Thereafter, the generated friction compensation signal is added to the current control signal output from the control unit 3 by the friction compensation unit 4.

Thereby, the control signal generated in the control unit 3 is corrected by the friction compensation signal generated by the friction compensation unit 4, and the drive motor 43 is controlled in accordance with the corrected control signal.

Thus, by correcting the control signal by the friction compensation signal, a tracking error caused by friction inherent in the feed apparatus 20 is compensated for, and thereby the movable body 22 is positioned with a higher accuracy.

Particularly, in the feed apparatus 20 including a ball (rolling body) as a component, such as the ball screw 41, when the direction of movement of the movable body 22 is reversed, elastic deformation occurs on the ball, the screw shaft and the like of the ball screw 41 due to acceleration or deceleration before and after the reversing, which results in the occurrence of a tracking error between a command movement position and the actual movement position of the movable body 22. Similarly, also when the movable body 22 in a stopped state is accelerated for moving it at a predetermined velocity, and when the movable body 22 moving at a predetermined velocity is decelerated for stopping it, elastic deformation occurs.

According to the controller 1 of this embodiment, the elastic deformation of the ball, the screw shaft and the like of the ball screw 41 occurring when the movable body 22 is accelerated or decelerated is regarded as variation in the frictional force inherent in the feed apparatus 20, the friction compensation signal for compensating for a tracking error due to the fiction force is generated in accordance with the above Equation 1 (function f(x)), and the generated friction compensation signal is added to the current control signal output from the control unit 3 to correct the current control signal. Therefore, the movable body 22 can be positioned with a higher accuracy even in a section where the movable body 22 is accelerated or decelerated.

Further, since the friction compensation signal at the times of acceleration and deceleration of the movable body 22 is generated by the above Equation 1, namely a so-called sigmoid function asymptotically approaching the maximum friction compensation value $F_0$ and the minimum friction compensation value $-F_0$ and having an inflection point therebetween, a friction compensation signal which does not accompany a sudden change, that is, changes smoothly can be obtained, and thereby a smooth tracking of the movable body 22 can be achieved.

3. Experimental Example

Hereinafter, an experimental example using the feed apparatus 20 and the controller 1 of this embodiment will be described using FIGS. 4 and 5.

Figure 4:
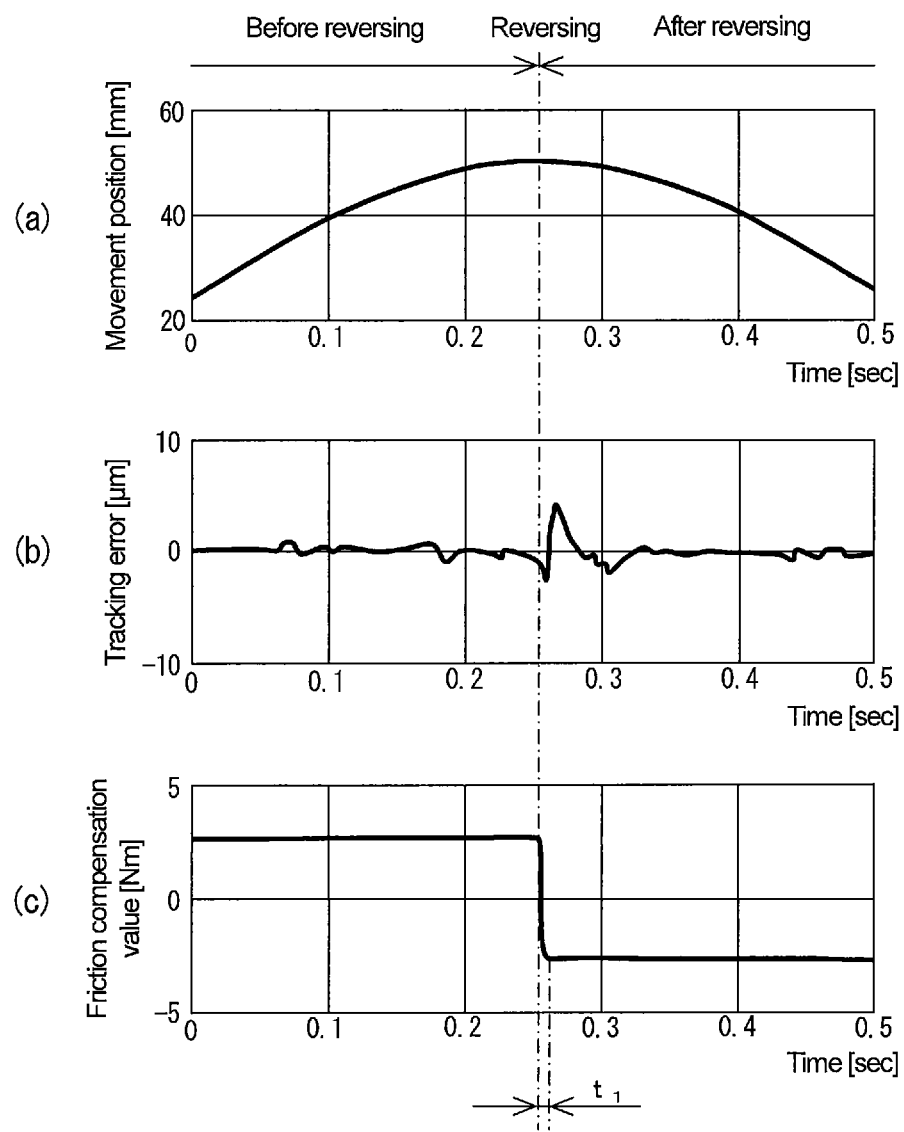
FIG. 4 shows graphs showing results obtained by performing friction compensation using a friction compensation value calculated by a conventional function.

FIG. 4 shows an experimental result obtained by performing friction compensation using a friction compensation value calculated in accordance with the foregoing conventional Equation 3. In FIG. 4, (a) is a diagrammatic drawing showing a movement position of the movable body 22 with elapse of time, wherein the direction of movement of the movable body 22 is reversed at a time point of 0.25 seconds. Further, (c) is a diagrammatic drawing showing a friction compensation value used for the friction compensation, and (b) is a diagrammatic drawing showing a tracking error of the movable body 22 to the command movement position.

Figure 5:
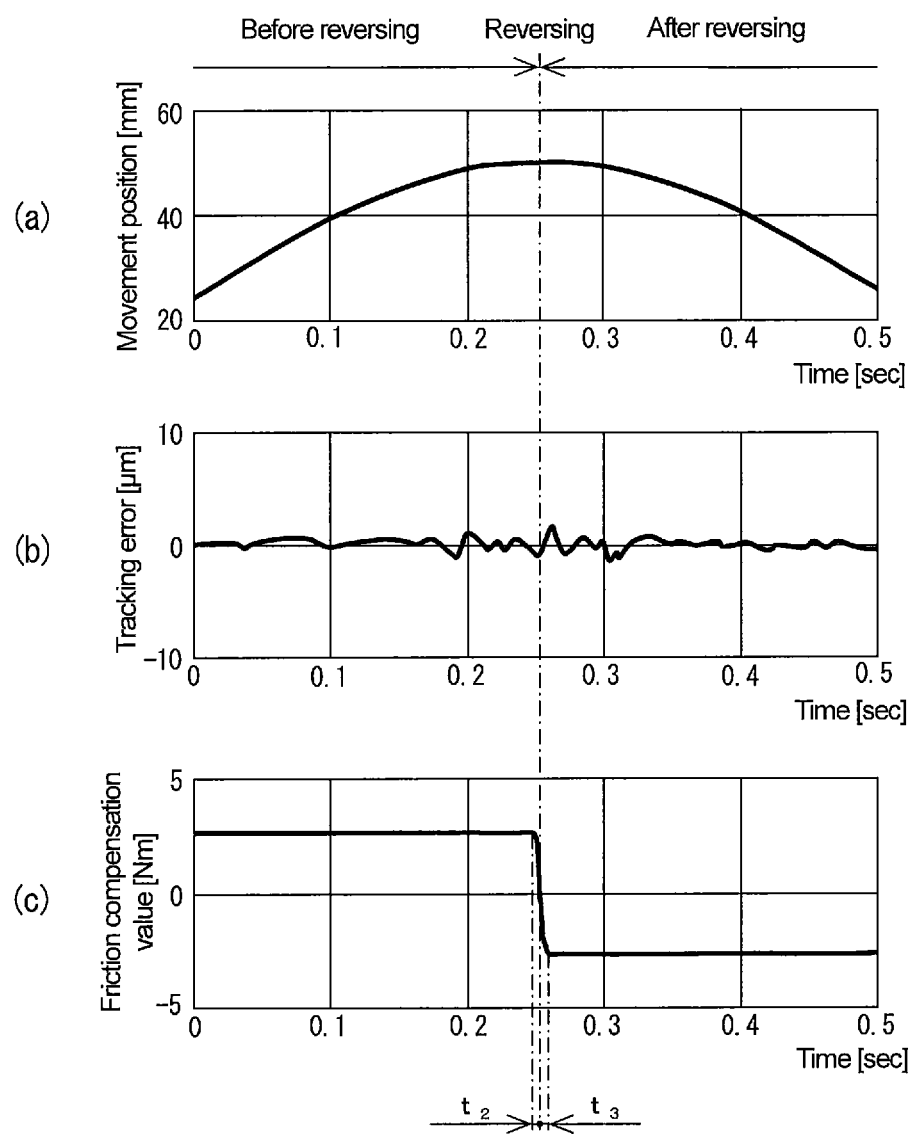
FIG. 5 shows graphs showing results obtained by performing friction compensation using a friction compensation value calculated by a function according to the embodiment.

FIG. 5 shows an experimental result obtained by performing friction compensation by the friction compensation unit 4 of this embodiment, namely using a friction compensation value calculated in accordance with the Equation 1. In the same manner as the above, in FIG. 5, (a) is a diagrammatic drawing showing a movement position of the movable body 22 with elapse of time, wherein the direction of movement of the movable body 22 is reversed at a time point of 0.25 seconds. Further, (c) is a diagrammatic drawing showing a friction compensation value calculated by the friction compensation unit 4, and (b) is a diagrammatic drawing showing a tracking error of the movable body 22 to the command movement position.

As shown in FIG. 4(c), the friction compensation value according to the conventional example changes in accordance with the sinc function in a predetermined period $t_1$ after the direction of movement of the movable body 22 is reversed. On the other hand, as shown in FIG. 5(c), the friction compensation value according to the present disclosure changes in accordance with the sigmoid function in a predetermined period $t_2$ before the direction of movement of the movable body 22 is reversed and in a predetermined period $t_3$ after the reversing.

Further, as shown in FIG. 4(b), in the friction compensation according to the conventional example, a tracking error of at most about 4 μm (4.24 μm in the actual data) occurs at the time of reversing the movable body 22. On the other hand, in the friction compensation according to the present disclosure, a tracking error at the time of reversing the movable body 22 is suppressed up to about 2 μm (1.65 μm in the actual data).

From the above experimental results, it was demonstrated that, according to the controller 1 of this embodiment, the tracking error at the time of reversing the movable body 22 can be suppressed more effectively as compared with the conventional example and a more highly accurate positioning control can be achieved.

Although one embodiment of the present disclosure has been described above, the mode that can be adopted is not limited thereto in any way.

For example, although, in the above embodiment, the friction compensation unit 4 is configured to calculate the friction compensation value in accordance with the above Equation 1 for a section where the movable body 22 is accelerated or decelerated, the present disclosure is not limited to this configuration and the friction compensation unit 4 may be configured to calculate the friction compensation value in accordance with a function f(α) representing the friction compensation value uf by a relationship with the variable α and asymptotically approaching the maximum value and the minimum value of the friction compensation value uf and having an inflection point therebetween. Even when friction compensation in accordance with such a function f(α) is performed, an effect similar to that of the above embodiment can be achieved.

Further, a representative one of the function f(α) as described above is a sigmoid function and the Equation 1 of the above embodiment is a type of sigmoid function. Besides the Equation 1, a function represented by the following Equation 2 can be given as an example of the sigmoid function that can be employed.

$$f(l_d) = F_0 \frac{1/(\delta(l_d - R))}{\sqrt{1 + (1/(\delta(l_d - R))^2)}} \quad \text{[Equation 2]}$$

Where $l_d$ is a ratio of a relative displacement amount $dx_t$ between the ball nut 44 and the ball screw 41 to an amount of rotation $d\theta$ of the ball screw 41, namely $l_d = dx_t/d\theta$. $dx_t$ and $d\theta$ are each an actual measured value, and $dx_t$ can be detected, for example, by a linear scale or the like, and $d\theta$ can be detected, for example, by the detector 45. It is noted that, as an example of arrangement of the linear scale, for example, a mode in which, in FIG. 1, a scale is disposed along the ball screw 41 on the base 21 in the vicinity of the ball screw 41 and a reader is disposed on the lower surface of the movable body 22 to face the scale can be given as an example.

Further, in the Equation 2, $F_0$ is the maximum friction compensation value, and R is a theoretical relative displacement amount between the ball nut 44 and the ball screw 41 per rotation of the ball screw 41, namely a lead of the screw shaft of the ball screw 41.

Further, δ is a constant determined theoretically or a constant determined empirically (experimentally) so that the friction compensation value to be calculated becomes an appropriate value, and in the case where δ is determined theoretically, it can be determined in accordance with the following equation.

$\delta = \log 10 Ks$

Where Ks is a rigidity of the whole drive unit 40 in the axial direction of the ball screw 41, and it can be calculated in accordance with the following equation, for example.

$1/Ks = 1/K\text{screw} + 1/K\text{ball} + 1/K\text{nut} + 1/K\text{bearing}$

Where Kscrew is a rigidity of the screw shaft of the ball screw 41, Kball is a rigidity of the ball of the ball screw 41, Knut is a rigidity of the nut 44, and Kbearing is a rigidity of the bearing 42.

Further, as for the positive and negative of the value of the function f(ld), although a value before reversing the movable body 22 is either positive or negative and a value after reversing the movable body 22 is the other, the positive and negative thereof is set as appropriate in conformity with the actual control condition.

Because the friction compensation in accordance the Equation 2 is based on a phenomenon that a difference occurs between $I_d$ and R due to elastic deformation of the ball screw 41 and the like caused by acceleration or deceleration at the time of reversing the movable body 22 and is based on the actual measured value $I_d$, the tracking error can be compensated for in a more real-time manner.

It is noted that, since the value of $l_d$ is, as described above, an actual measured value and has large variation, it is preferred that averaged data which is averaged by filtering actual measured data through a low-pass filter is used. Further, although the value of $l_d$ at the reversing position (a position at which the velocity of the movable body 22 is zero) is a finite value since it is an actual measured value, $f(l_d)=0$ is adopted since the theoretical value thereof is infinite.

Figure 6:
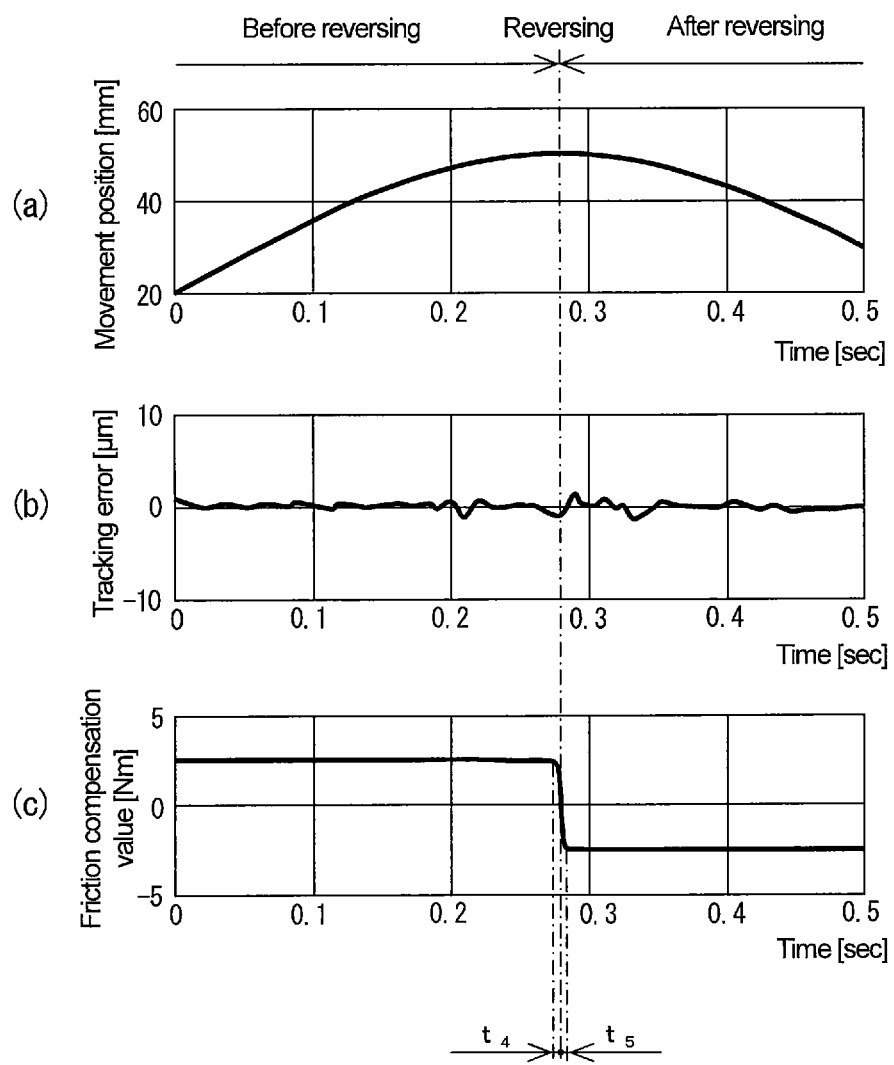
FIG. 6 shows graphs showing results obtained by performing friction compensation using a friction compensation value calculated by a function according to another embodiment.
Figure 7:
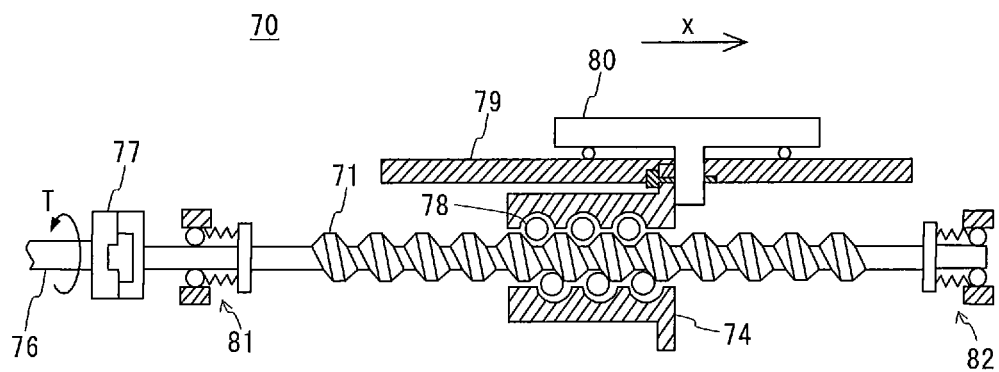
FIG. 7 is an explanatory diagram showing a structure model schematically representing a structure of a feed apparatus.
Figure 8:
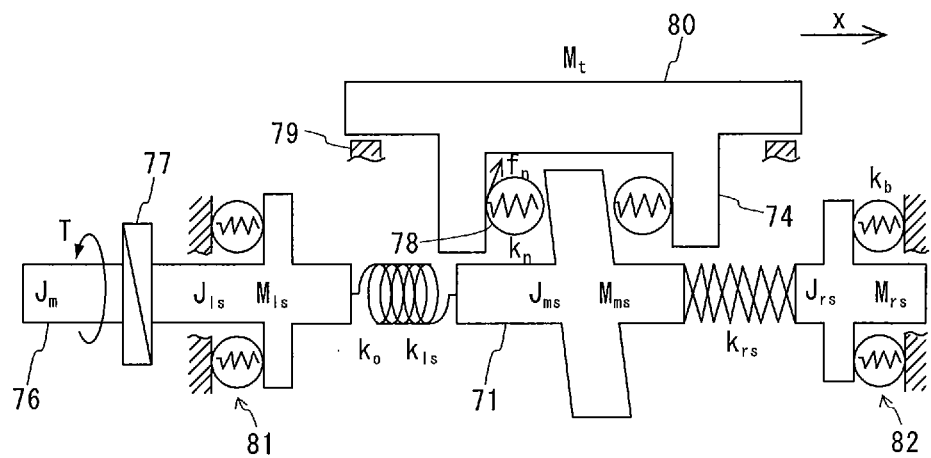
FIG. 8 is an explanatory diagram showing a physical model in which the structure model shown in FIG. 7 is represented using springs.
Figure 9:
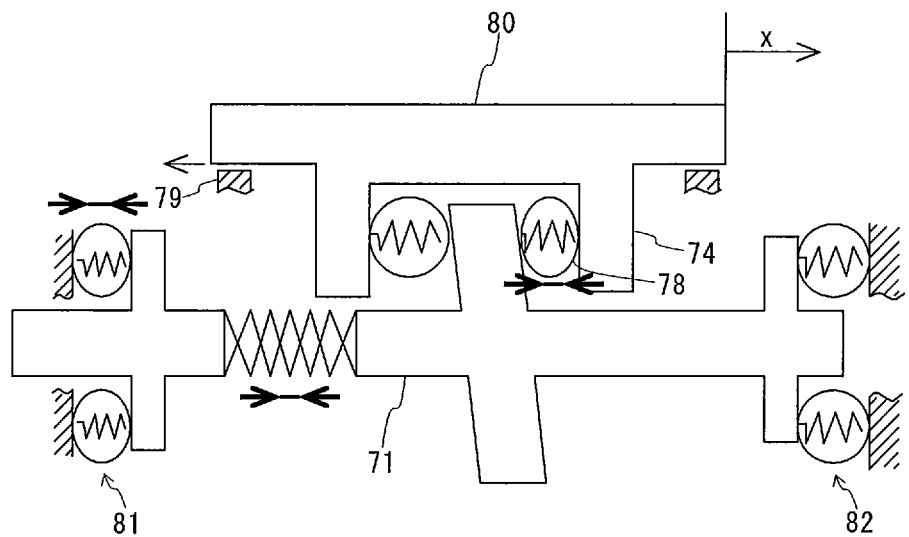
FIG. 9 is an explanatory diagram showing a mechanical state before reversing in a case where a table is reversed at a low deceleration in the physical model shown in FIG. 8.
Figure 10:
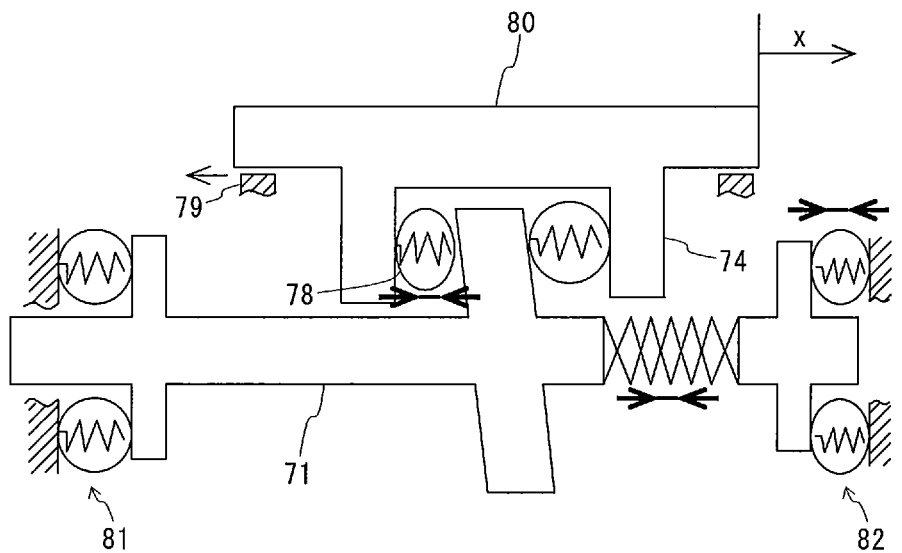
FIG. 10 is an explanatory diagram showing a mechanical state before reversing in a case where the table is reversed at a high deceleration in the physical model shown in FIG. 8.

An experimental result obtained by performing friction compensation using a friction compensation value calculated by the Equation 2 is shown in FIG. 6. In FIG. 6, (a) is a diagrammatic drawing showing a movement position of the movable body 22 with elapse of time, wherein the direction of movement of the movable body 22 is reversed at a time point of 0.275 seconds. Further, (c) is a diagrammatic drawing showing a friction compensation value, and (b) is a diagrammatic drawing showing a tracking error of the movable body 22 to the command movement position.

As shown in FIG. 6(c), the friction compensation value changes in accordance with the above Equation 2 in a predetermined period $t_4$ before the direction of movement of the movable body 22 is reversed and in a predetermined period $t_5$ after reversed. As shown in FIG. 6(b), also in this friction compensation, the tracking error at the time of reversing the movable body 22 is suppressed up to about 2 μm similarly to the experimental example shown in FIG. 4.

Thus, similarly to the friction compensation in accordance with the above Equation 1, the friction compensation in accordance with the above Equation 2 also makes it possible to more effectively suppress the tracking error at the time of reversing the movable body 22 as compared with the conventional example, and thereby a more highly accurate positioning control can be achieved.

What is claimed is:

1. A controller which, in a feed apparatus having a guide unit which guides movement of a movable body in a predetermined movement-axis direction and a drive unit which has a ball screw, a ball nut and a drive motor for rotating the ball screw and moves the movable body in the movement-axis direction, controls operation of the drive motor, the controller comprising:

an NC program analysis unit analyzing an NC program, extracting commands relating to a target movement position and a moving velocity contained in the NC program, and outputting the extracted commands relating to the target movement position and the moving velocity;

a control unit receiving the commands relating to the target movement position and the moving velocity output from the NC program analysis unit, generating, based on the received commands relating to the target movement position and the moving velocity, a command movement position at time intervals corresponding to the moving velocity, generating a control signal in accordance with the generated command movement position, and controlling the drive motor in accordance with the generated control signal to move the movable body; and a friction compensation unit receiving the commands relating to the target movement position output from the NC program analysis unit and a signal relating to the command movement position generated by the control unit, recognizing, based on the received commands relating to the target movement position and the received signal relating to the command movement position, a reversing position at which a direction of movement of the movable body is reversed by the control unit, and generating a friction compensation signal corresponding to the position of the movable body and adding the generated friction compensation signal to the control signal in order to compensate for at least a positioning error of the movable body caused by friction in the guide unit, wherein:

the friction compensation unit is configured to, when the direction of movement of the movable body is reversed by the control unit, generate the friction compensation signal using a friction compensation value uf, the friction compensation value uf used being one of predetermined maximum value and minimum value for a period of time until the movable body reaches a predetermined position before the reversing position before the direction of movement is reversed, being a value calculated in accordance with a function $f(\alpha)$ which represents the friction compensation value uf by a relationship with a variable $\alpha$, for a period of time during which the movable body reaches the reversing position from the predetermined position before the reversing position and is reversed at the reversing position, and then moves to a predetermined position after reverse, and being the other of the predetermined maximum value and minimum value for a period of time during which the movable body moves further from the predetermined position after reverse; and the function $f(\alpha)$ asymptotically approaches the maximum value and the minimum value of the friction compensation value uf and has an inflection point between the maximum value and the minimum value.

2. The controller of claim 1, wherein the function $f(\alpha)$ is a sigmoid function.

3. The controller of claim 2, wherein:

the function $f(\alpha)$ is a function $f(x)$ where a reversing position of the movable body is used as a reference and the variable $\alpha$ is a distance x from the reversing position to the movable body; and the function $f(x)$ is represented by a following equation:

$$f(x) = F_0 \frac{x/\sigma}{\sqrt{1 + (x/\sigma)^2}}$$

where $F_0$ is the maximum friction compensation value of the friction compensation value of and $\sigma$ is a constant determined empirically.

4. The controller of claim 2, wherein:

the function $f(\alpha)$ is a function $f(l_d)$ where the variable $\alpha$ is $l_d$ which is a ratio of a relative displacement amount $dx_t$ between the ball nut and the ball screw to an amount of rotation $d\theta$ of the ball screw; and the function $f(l_d)$ is represented by a following equation:

$$f(l_d) = F_0 \frac{1/(\delta(I_d - R))}{\sqrt{1 + (1/(\delta(I_d - R))^2)}}$$

where $l_d = dx_t/d\theta$, $F_0$ is the maximum friction compensation value, $dx_t$ and $d\theta$ are each an actual measured value, R is a theoretical relative displacement amount between the ball nut and the ball screw per rotation of the ball screw, and $\delta$ is a constant determined theoretically or empirically.

5. A control method of, in a feed apparatus having a guide unit which guides movement of a movable body in a predetermined movement-axis direction, and a drive unit which has a ball screw, a ball nut, and a drive motor for rotating the ball screw and moves the movable body in the movement-axis direction, controlling operation of the drive motor, the control method comprising:

with an NC program analysis unit, analyzing an NC program and extracting commands relating to a target movement position and a moving velocity contained in the NC program;

with a control unit, generating, based on the extracted target movement position and moving velocity, a command movement position at time intervals corresponding to the moving velocity generating a control signal in accordance with the generated command movement position, and controlling the drive motor in accordance with the generated control signal to move the movable body; and with a friction compensation unit, recognizing, based on the commands relating to the target movement position extracted with the NC program analysis unit and a signal relating to the command movement position generated with the control unit, a reversing position at which a direction of movement of the movable body is reversed, and generating a friction compensation signal corresponding to the position of the movable body and adding the generated friction compensation signal to the control signal in order to compensate for at least a positioning error of the movable body caused by friction in the guide unit, wherein:

when the direction of movement of the movable body is reversed with the control unit, the friction compensation signal is generated using a friction compensation value uf with the friction compensation unit, the friction compensation value uf used being one of predetermined maximum value and minimum value for a period of time until the movable body reaches a predetermined position before the reversing position before the direction of movement is reversed, being a value calculated in accordance with a function $f(\alpha)$ which represents the friction compensation value uf by a relationship with a variable $\alpha$, for a period of time during which the movable body reaches the reversing position from the predetermined position before the reversing position and is reversed at the reversing position, and then moves to a predetermined position after reverse, and being the other of the predetermined maximum value and minimum value for a period of time during which the movable body moves further from the predetermined position after reverse; and the function $f(\alpha)$ asymptotically approaches the maximum value and the minimum value of the friction compensation value uf and has an inflection point between the maximum value and the minimum value is added to the control signal.

* * * * *